US007404350B2

(12) United States Patent
Chuang

(10) Patent No.: US 7,404,350 B2
(45) Date of Patent: Jul. 29, 2008

(54) POSITIONING DEVICE FOR THE WORK-PIECE BACKING PLATE OF A TABLE SAWING MACHINE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 490 days.

(21) Appl. No.: 11/263,964

(22) Filed: Nov. 2, 2005

(65) Prior Publication Data

US 2007/0095184 A1 May 3, 2007

(51) Int. Cl.
*B23D 45/06* (2006.01)

(52) U.S. Cl. ....................................... 83/438; 83/477.2

(58) Field of Classification Search .................. 83/438, 83/477.2, 446

See application file for complete search history.

(56) References Cited

U.S. PATENT DOCUMENTS 5,722,308 A * 3/1998 Ceroll et al. .................. 83/438
5,931,209 A * 8/1999 Chang ........................ 144/287
6,293,176 B1 * 9/2001 Talesky ....................... 83/438
6,736,042 B2 * 5/2004 Behne et al. ............... 83/440.2

* cited by examiner

*Primary Examiner*—Kenneth E. Peterson
(74) *Attorney, Agent, or Firm*—Ming Chow; Sinorica, LLC

(57) ABSTRACT

A positioning device for the work-piece backing plate of a table sawing machine includes a machine seat, a work-piece backing plate and a position-limiting device. The work-piece backing plate has its opposite sides respectively fixed with a rack engaged with a gear set installed in the interior of the machine seat. The work-piece backing plate can be controlled by the gear set to move forward and backward on the machine seat. The position-limiting device is assembled in the interior of the machine seat for restricting and fixing the work-piece backing plate in position to prevent the work-piece backing plate from shifting bias in the course of processing, able to elevate processing precision.

2 Claims, 5 Drawing Sheets

POSITIONING DEVICE FOR THE WORK-PIECE BACKING PLATE OF A TABLE SAWING MACHINE

BACKGROUND OF THE INVENTION

1. Field of the Invention

This invention relates to a positioning device for the work-piece backing plate of a table sawing machine, particularly to one able to prevent the work-piece backing plate from shifting bias to elevate precision in processing.

2. Description of the Prior Art

The work-piece backing plate of a conventional table sawing machine, as disclosed in a U.S. Pat. No. 6,736,042 B2, is provided at one side with an eccentric handle to be turned for actuating the opposite ends of a connecting rod to tightly clamp the side edges of a work table and firmly position the work-piece backing plate.

However, the handle of the work-piece backing plate of the conventional table sawing machine is exposed out of the outer edge of the table sawing machine for the sake of being operated conveniently. Therefore, in case of carelessness, an operator is likely to bump against the handle and get injured or cause damage to the handle.

SUMMARY OF THE INVENTION

The objective of this invention is to offer a positioning device for the work piece backing plate of a table sawing machine, composed of a position-limiting device that is pivotally assembled at a preset location between two racks of a work-piece backing plate. A rotary arm assembled inside the table sawing machine can be turned to control the position-limiting device to press tight the two racks of the work-piece backing plate and firmly fix the work-piece backing plate in position to prevent the work-piece backing plate from shifting bias, able to elevate processing precision. In addition, the rotary arm is positioned inside the table sawing machine, able to protect a user from bumping against the rotary arm and getting injured.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
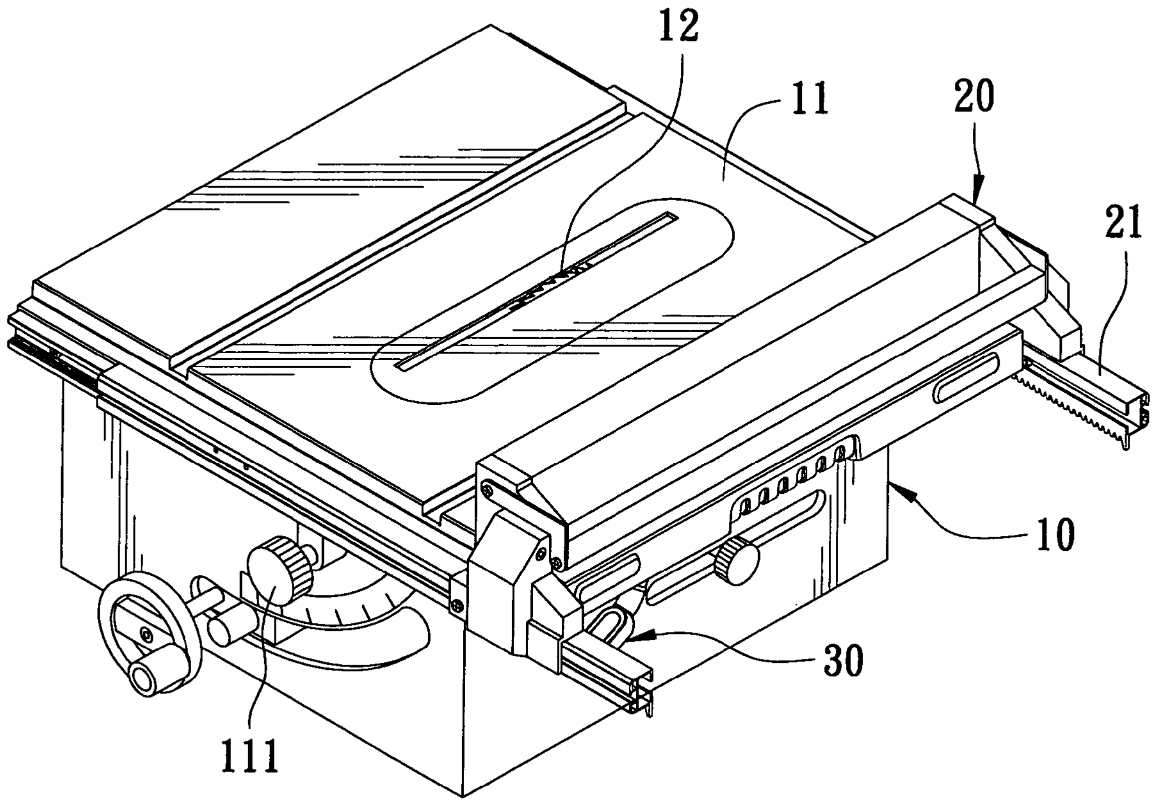
FIG. 1 is a perspective view of a positioning device for the work-piece backing plate of a table sawing machine in the present invention.
Figure 2:
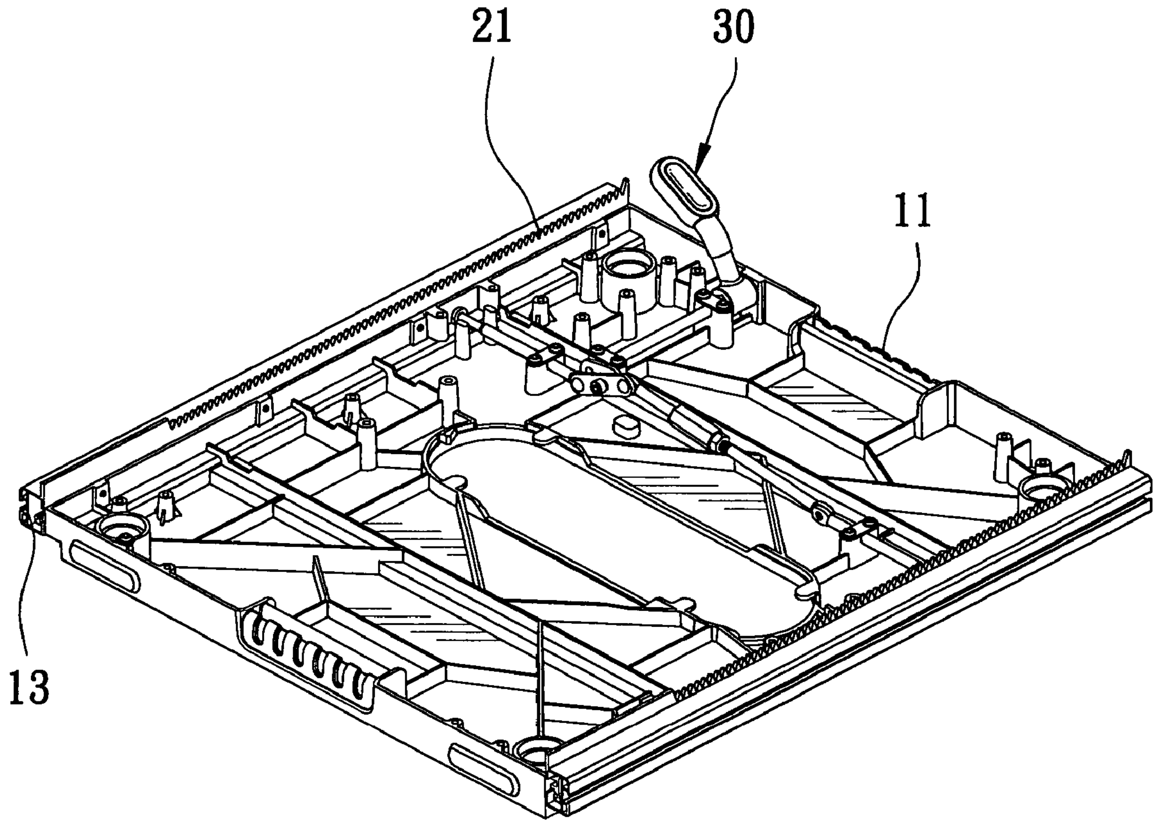
FIG. 2 is a partial bottom view of the positioning device for the work-piece backing plate of a table sawing machine in the present invention.
Figure 3:
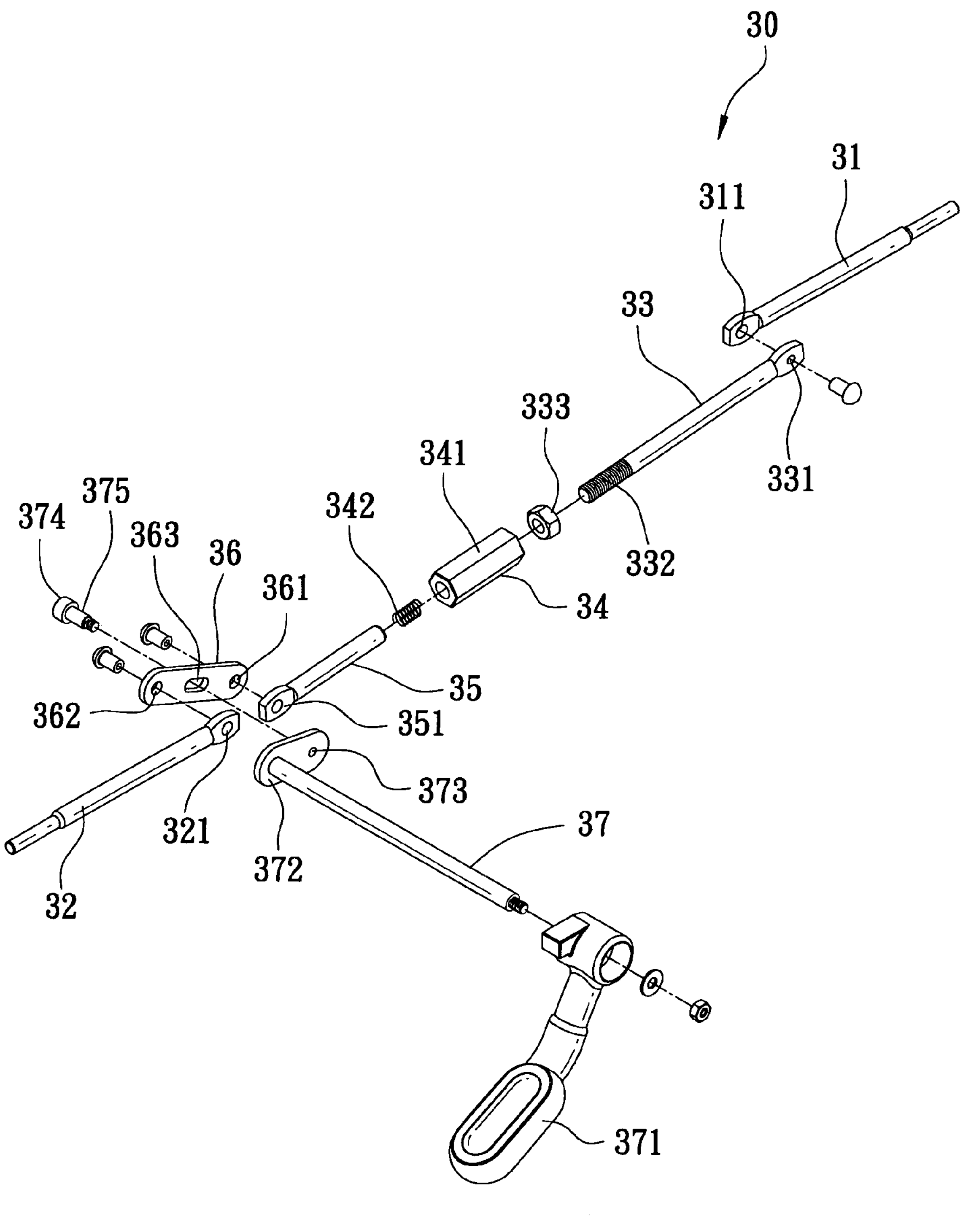
FIG. 3 is an exploded perspective view of a position-limiting device in the present invention.

A preferred embodiment of a positioning device for the work-piece backing plate of a table sawing machine in the present invention, as shown in FIGS. 1, 2 and 3, includes a machine seat 10, a work-piece backing plate 20 and a position-limiting device 30.

The machine seat 10 has its topside provided with a work table 11 having a saw base 12 assembled thereon.

The work-piece backing plate 20 positioned at a preset location on the topside of the work table 11 has its opposite sides respectively fixed with a rack 21 sliding in a slide groove 13 respectively provided at the opposite sides of the work-piece backing plate 20. The work table 11 is further fixed at a preset location with a gear set 111 engaged with the two racks 21 to be turned for controlling the two racks 21 to move forward or backward.

The position-limiting device 30 is pivotally assembled at a preset location between the two racks 21, composed of two end shafts 31 , 32, a threaded shaft 33, an elastic block 34, a driven shaft 35, a combining plate 36 and a rotary arm 37.

The two end shafts 31, 32 respectively have the outer end positioned at a preset location in the interior of the worktable 11 and the inner end bored with a pivotal hole 311, 321.

The threaded shaft 33 has one end bored with a pivotal hole 331 to be pivotally riveted with the pivotal hole 311 of the end shaft 31 and the other end formed with male threads 332 screwed thereon with a nut 333.

The elastic block 34 is a hollow tubular body 341 having an elastic member 342 fitted therein. The hollow tubular body 341 has one end threadably connected with the threaded shaft 33 whose length positioned in the elastic block 34 can be controlled by the nut 333. The hollow tubular body 341 has the other end connected with the driven shaft 35.

The driven shaft 35 has one end connected with the elastic block 34 and the other end bored with a pivotal hole 351.

The combining plate 36 has its opposite ends respectively bored with a pivotal hole 361, 362 to be respectively and pivotally riveted with the driven shaft 35 and the end shaft 32. The combining plate 36 is further bored with a slide slot 363 in the center.

The rotary arm 37 is pivotally connected with a turning handle 371 at a preset portion projecting out of the machine seat 10 and has its inner end secured with a long fixing plate 372 bored with a threaded hole 373 in the other end distant from the rotary arm 37. A bolt 374 with a circular shank 375 is inserted through the slide slot 363 of the combining plate 36 and firmly screwed with the threaded hole 373 of the fixing plate 372, able to slide horizontally in the slide slot 363.

Figure 4:
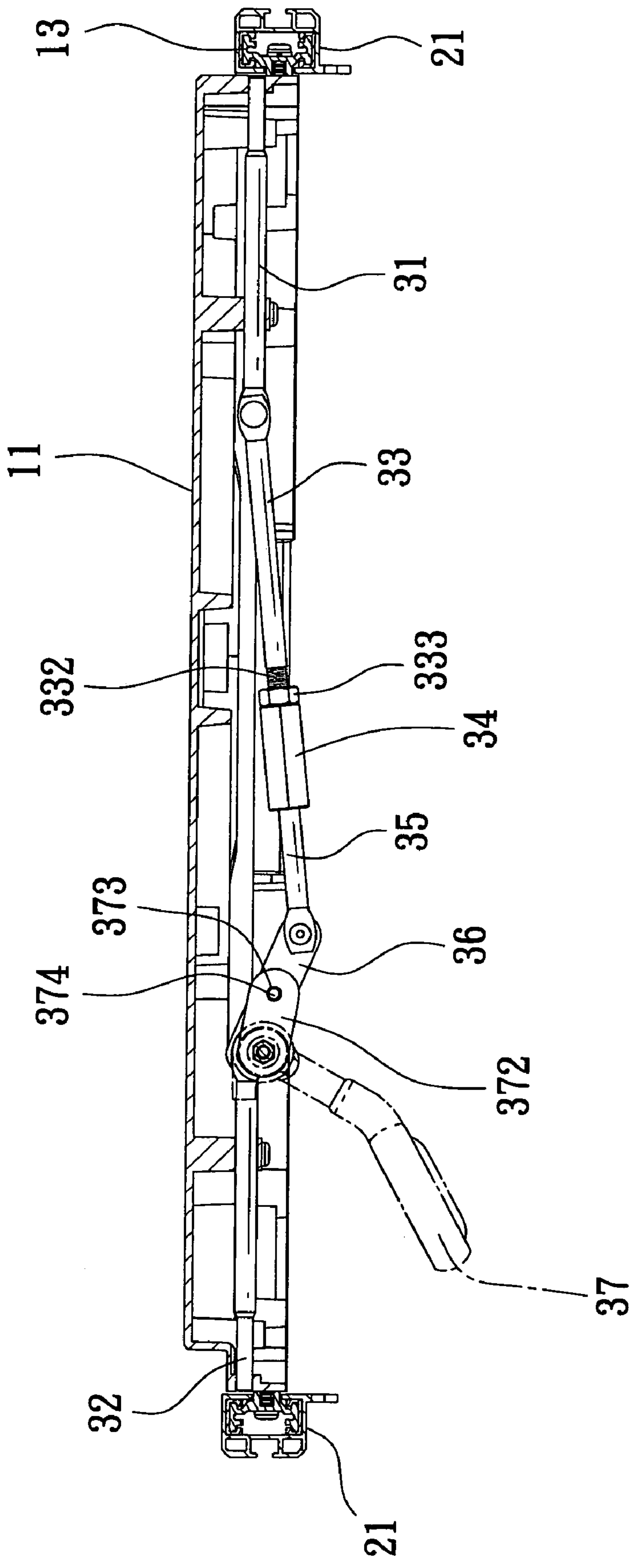
FIG. 4 is a side cross-sectional view of the position-limiting device not yet being tightened in the present invention.
Figure 5:
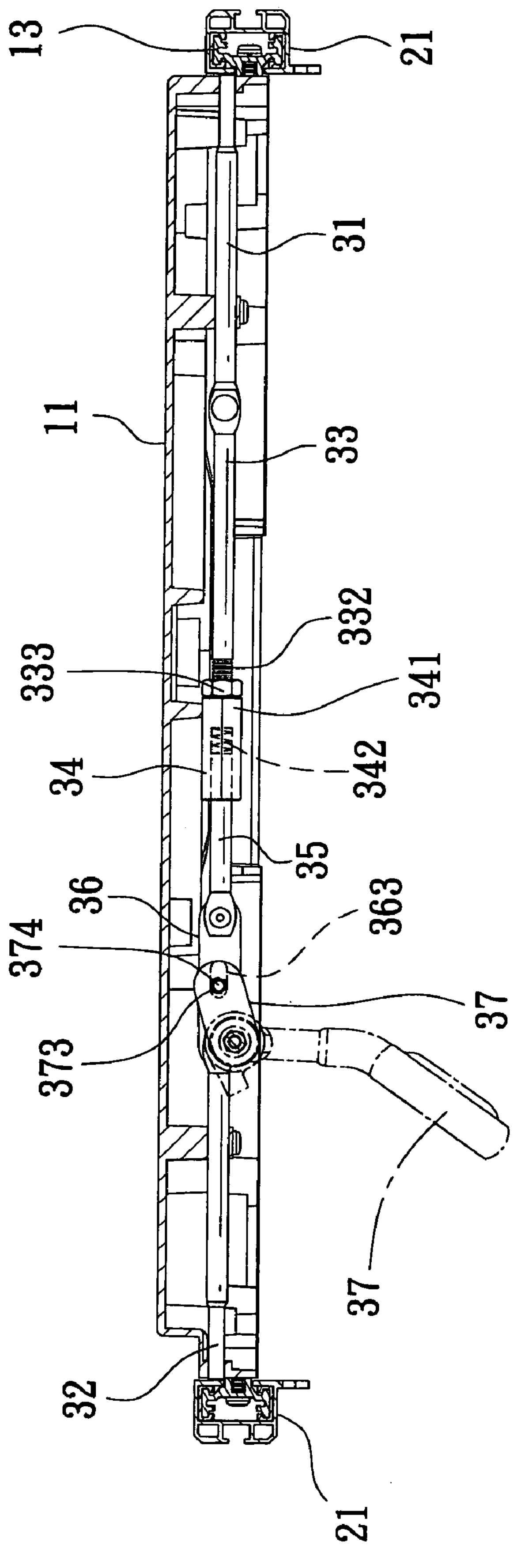
FIG. 5 is a side cross-sectional view of the position-limiting device in a tightened condition in the present invention.

In using, referring to FIGS. 1, 4 and 5, before the position-limiting device 30 is actuated to be tightened, the two end shafts 31, 32 are respectively and pivotally positioned at a preset location between the two racks 21, and the gear set 111 can be freely turned to adjust the position of the work-piece backing plate 20. After the work-piece backing plate 20 is adjusted to a proper position, the turning handle 371 of the rotary arm 37 is swung to drive the fixing plate 372 to swing eccentrically and actuate the bolt 374 thereon to turn the combining plate 36 and the position-limiting device 30, letting the shafts of the position-limiting device 30 pushed and kept in a tightened condition. At this time, the two end shafts 31, 32 are respectively extended outward to push against the two racks 21 to force the two racks 21 to tightly press the two slide grooves 13 and become impossible to slide in the slide grooves 13. In addition, the nut 333 screwed on the threaded shaft 33 of the position-limiting device 30 can be turned to control the length of the threaded shaft 33 positioned in the interior of the ho low tubular body 341 of the elastic block 34 so as to enable the threaded shaft 33 to control the compressed extent of the elastic member 342 in the elastic block 34. Therefore, when the position-limiting device 30 is not actuated to be tightened, it still can be kept in a firmly tightened condition.

To sum up, this invention has the following advantages.

1. The rotary arm of the position-limiting device is pivotally positioned under the worktable of the table sawing machine, able to prevent a user from bumping against the rotary arm due to carelessness.

2. The position-limiting device can be actuated to firmly fix the work-piece backing plate in position for preventing the work-piece backing plate from shifting bias in the course of processing, able to elevate processing quality.

3. The elastic member fitted in the elastic block enables the position-limiting device to be kept in a firmly tightened condition when the position-limiting device is not yet actuated to be tightened, able to prevent the components of the position-limiting device from turning freely and losing efficacy.

While the preferred embodiment of the invention has been described above, it will be recognized and understood that various modifications may be made therein and the appended claims are intended to cover all such modifications that may fall within the spirit and scope of the invention.

I claim:

1. A table saw having a machine seat and a work-piece backing plate, said machine seat provided with a work table having a saw base assembled thereon, said work-piece backing plate positioned at one side on the topside of said work table, said work-piece backing plate having its opposite sides respectively each fixed with a rack, said two racks respectively positioned and sliding in a slide groove provided at the opposite sides of said work table, said work table further installed with a gear set at a preset location, said gear set engaged with said two racks, said gear set turned to control said two racks to move forward or backward along said two slide grooves: and, characterized by a position-limiting device pivotally positioned at a preset location between said two racks, said position-limiting device composed of two end shafts, a threaded shaft, an elastic block, a driven shaft, a combining plate and a rotary arm;

said two end shafts respectively assembled at a preset location of said work table, said two end shafts respectively having one end bored with a pivotal hole;

said threaded shaft having one end bored with a pivotal hole to be pivotally connected with one of said end shafts, said threaded shaft having the other end formed with male threads, said male threads of said threaded shaft screwed thereon with a nut;

said elastic block being a hollow tubular body, said elastic block having an elastic member inserted therein, said hollow tubular body having one end connected with said threaded shaft, said hollow tubular body having the other end connected with said driven shaft;

said driven shaft having one end fitted in said elastic block, said driven shaft having the other end bored with a pivotal hole;

said combining plate having its opposite ends respectively bored with a pivotal hole, said two pivotal holes of said combining plate respectively and pivotally connected with said driven shaft and the other of said end shafts, said combining plate bored with a slide slot in the center;

said rotary arm provided with a turning handle at a preset portion projecting out of said machine seat, said rotary arm having its inner end secured with a long fixing plate, said fixing plate bored with a threaded hole in the other end distant from said rotary arm, a bolt inserted through said slide slot of said combining plate and screwed with said threaded hole of said fixing plate.

2. The table saw as claimed in claim 1, wherein said bolt is formed with a circular shank inserted through said slide slot of said combining plate.

* * * * *